(12) United States Patent
Bond et al.

(10) Patent No.: US 8,549,464 B2
(45) Date of Patent: Oct. 1, 2013

(54) REUSING EXPRESSION GRAPHS IN COMPUTER PROGRAMMING LANGUAGES

(75) Inventors: Barry Clayton Bond, Redmond, WA (US); Vivian Sewelson, Redmond, WA (US); Daniel Johannes Pieter Leijin, Bellevue, WA (US); Lubomir Boyanov Litchev, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 282 days.

(21) Appl. No.: 12/952,077

(22) Filed: Nov. 22, 2010

(65) Prior Publication Data
US 2012/0131537 A1    May 24, 2012

(51) Int. Cl.
| | | |
|---|---|---|
| G06F 15/00 | (2006.01) | |
| G06F 7/38 | (2006.01) | |
| G06F 9/30 | (2006.01) | |
| G06F 9/40 | (2006.01) | |
| G06F 9/455 | (2006.01) | |
| G06F 9/44 | (2006.01) | |
| G06F 9/45 | (2006.01) | |
| G06F 9/46 | (2006.01) | |

(52) U.S. Cl.
USPC ........... 717/100; 345/505; 708/443; 712/210; 716/107; 717/105; 717/106; 717/143; 717/156; 717/157; 718/105

(58) Field of Classification Search
None
See application file for complete search history.

(56) References Cited

U.S. PATENT DOCUMENTS

| 5,836,014 A * | 11/1998 | Faiman, Jr. ................ 717/156 |
|---|---|---|
| 6,466,930 B1 * | 10/2002 | Gardner ..................... 712/210 |
| 6,578,197 B1 * | 6/2003 | Peercy et al. ............... 717/143 |
| 7,140,008 B2 | 11/2006 | Chilimbi et al. |
| 7,222,317 B1 * | 5/2007 | Mathur et al. .............. 716/107 |
| 7,543,284 B2 * | 6/2009 | Bolton et al. ............... 717/157 |
| 7,716,630 B2 | 5/2010 | Wholey et al. |
| 7,733,347 B2 * | 6/2010 | Tarditi et al. ............... 718/105 |
| 2004/0006765 A1 | 1/2004 | Goldman |
| 2006/0098019 A1 * | 5/2006 | Tarditi et al. ............... 345/505 |
| 2006/0107250 A1 * | 5/2006 | Tarditi et al. ............... 717/105 |
| 2006/0274070 A1 | 12/2006 | Herman et al. |
| 2008/0052687 A1 | 2/2008 | Gonzales-Tuchmann et al. |

(Continued)

OTHER PUBLICATIONS

Joud Khoury et al., Towards Formalizing Network Archtectural Descriptions, 2010, [Retrieved on May 7, 2013]. Retrieved from the internet: <URL: http://link.springer.com/content/pdf/10.1007%2F978-3-642-11811-1_11.pdf> 14 Pages (133-145).*

(Continued)

*Primary Examiner* — Don Wong
*Assistant Examiner* — Anibal Rivera

(57) ABSTRACT

A reusable expression graph system and method that generates reusable expression graphs that can be used with potentially different input parameters in order to achieve computational efficiency and ease of programming. Reusable expression graph mitigate the need to rebuild an expression for each new value. This is achieved in part by creating a node called a "parameter node." The parameter node acts as a generic placeholder for a leaf node in the expression graph. In addition, the parameter node acts as a proxy for a bindable term of the leaf node, and the bindable term can be either a value or one or more additional expressions. The parameter node then is bound to the bindable term and the expression is evaluated with that bindable term instead of the placeholder. The parameter node created by embodiments of the reusable expression graph system and method works across many different programming languages.

20 Claims, 6 Drawing Sheets

(56) References Cited

U.S. PATENT DOCUMENTS

| | | | |
|---|---|---|---|
| 2008/0189345 A1* | 8/2008 | Guenter | 708/443 |
| 2009/0100416 A1 | 4/2009 | Brown et al. | |
| 2009/0265685 A1* | 10/2009 | Guenter | 717/106 |
| 2010/0088665 A1 | 4/2010 | Langworthy et al. | |

OTHER PUBLICATIONS

Tony Clark et al., Language Factories, Oct. 2009, [Retrieved on May 7, 2013]. Retrieved from the internet: <URL: http://dl.acm.org/citation.cfm?id=1640062> 8 Pages (949-955).*

Levin, et al., "Realizing Expression Graphs using Tablelookup FPGAs", Retrieved at << http://ieeexplore.ieee.org/stamp/stamp.jsp?arnumber=00410655 >>, Proceedings EURO-DAC European Design Automation Conference with EURO-VHDL, Sep. 20-24, 1993, pp. 306-311.

Watari, Shigeru., "An Experience in Morphe: Dynamic Binding in Part-Whole Graphs to Enhance Reusability", Retrieved at << http://citeseerx.ist.psu.edu/viewdoc/download?doi=10.1.1.43.5722&rep=rep1&type=pdf. >>, 1993, pp. 1-15.

* cited by examiner c = a + b c = P1 + b c = P1 + P2 c = P3 + b,
where P3 = (a*b)

c = P1 + P4
where P4 = (a*P5)

REUSING EXPRESSION GRAPHS IN COMPUTER PROGRAMMING LANGUAGES

BACKGROUND

Software developers often use functions when coding software programs. A function is a portion of code within a larger program that performs particular assignment and is relatively independent of the remainder of the code. Functions allow a developer to divide a program into sections so that those sections can be reused throughout the program for different value without the need to rewrite the program each time the values are changed.

In general, a function accepts a parameter as input, processes the parameter according to the function, and then returns a result. A parameter is a generic placeholder that acts as a proxy until an actual value is assigned to the parameter. Once the actual value is assigned to the parameter then the expression is evaluated with the assigned value rather than the placeholder.

Software developers also may use of expressions, which are a combination of functions and values. Software developers often build up expressions when they are writing programs. Based on rules of precedence and association for the particular programming language being used, an expression is computed and a value or answer is returned. This process of computing and returning a value for an expression is known as "evaluating the expression."

One way in which expressions are represented so that they can be evaluated is by using expression graphs. An expression graph is a directed acyclic graph having nodes and edges. The nodes are values and operators that are connected to each other by edges. For example, assume a simple expression is created that is (A+B)*C. In order to build an expression graph for this expression nodes are created for "A," "B," and "C" and nodes "A" and "B" are connected by a "+" node. Moreover, a node is created for "*" and that node is placed above the "+" node and a line is drawn down to the "+" node and a line down to C. This is an expression graph representing the expression (A+B)*C.

Expression graphs include both operator nodes and leaf nodes. A leaf node (or external node) is a node of an expression graph that contains a value. In addition, the leaf node has zero child nodes or other nodes hanging off of them. An operator node is a node in the expression graph that performs an operation (such as addition or multiplication) on the values in the leaf nodes. In the above example, the "+" node and the "*" node are operator nodes, and the values "A," "B," and "C" nodes are leaf nodes.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the reusable expression graph system and method reuse expression graphs with potentially different input parameters in order to achieve computational efficiency and ease of programming. In a similar way that functions allow a programmer to reuse code, embodiments of the reusable expression graph system and method allow expression graphs (and thereby expressions) to be reused without the need to rebuild the expression for each new value.

Embodiments of the reusable expression graph system and method include a node called a "parameter node." This parameter node is a leaf node that can be bound to any expression node, including other leaf nodes. Thus, the parameter node is a leaf node that is a generic placeholder. Moreover, the parameter node is placeholder that is not restricted to leaf nodes but other types of nodes as well. The parameter node can act as a proxy for a bindable term of the leaf node, and the bindable term can be either a value or one or more additional expressions. The parameter node then is bound to the bindable term and the expression is evaluated with that bindable term rather than the placeholder.

Embodiments of the reusable expression graph system and method mitigate the instances of a developer having to rebuild an entire expression each time they wanted to change the value of a leaf node. In other words, the developer does not have to run the code to rebuild the expression every time the value of a leaf node is changed. Moreover, the parameter node created by embodiments of the reusable expression graph system and method works across many different types of programming languages.

It should be noted that alternative embodiments are possible, and that steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout:

DETAILED DESCRIPTION

In the following description of embodiments of the reusable expression graph system and method reference is made to the accompanying drawings, which form a part thereof, and in which is shown by way of illustration a specific example whereby embodiments of the reusable expression graph system and method may be practiced. It is to be understood that other embodiments may be utilized and structural changes may be made without departing from the scope of the claimed subject matter.

I. Overview

Figure 1:
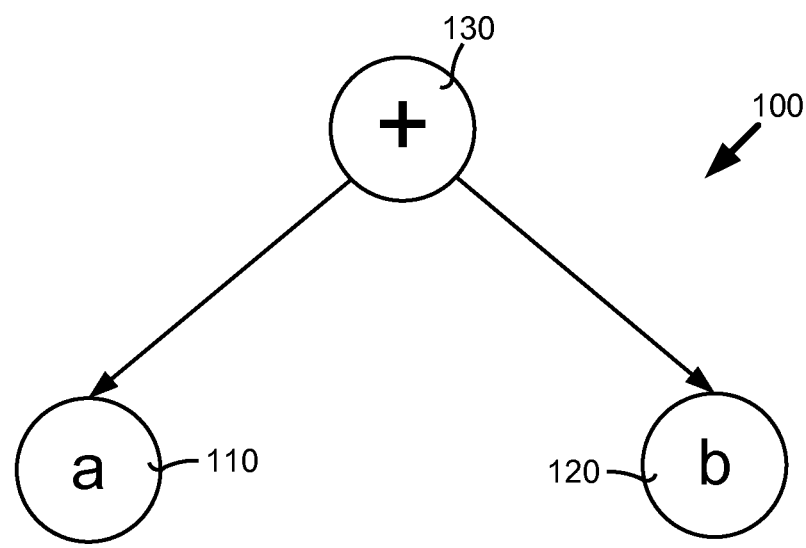
FIG. 1 illustrates an example of a standard expression graph 100 representing an expression c=a+b.

Embodiments of the reusable expression graph system and method build and evaluate expressions represented by expression graphs. FIG. 1 illustrates an example of a standard expression graph 100 representing the expression c=a+b. As shown in FIG. 1, the standard expression graph 100 includes a first node 110 containing the hard value "a," and a second node 120 containing the hard value "b." The first node 110 and the second node 120 are joined by an operator node 130 representing the addition operator. Note that in this example the "+" sign is an operator and the value "a" and the value "b" are operands.

For all of the reasons that functions are used in programming languages, it is also desirable to also use functions in embodiments of the reusable expression graph system and method. Just as functions allow a programmer to reuse code, embodiments of the reusable expression graph system and method facilitate the reuse of expressions represented by expression graphs. In a standard programming language a function uses a parameter as a generic placeholder. Thus, each time the function is reused all that is necessary is for the programmer to give a value to the placeholder and then the function will be evaluated with that value instead of the placeholder. Embodiments of the reusable expression graph system and method use this idea of a placeholder and apply it to expression graphs to make the expression graph reusable.

II. Operational Details

The operational details of embodiments of the reusable expression graph system and method now will be discussed.

II.A. Parameter Node

Embodiments of the reusable expression graph system and method create and use a node called a "parameter node." The parameter node allows an expression graph to be reused. A parameter node is a generic placeholder in an expression graph that allows for a bindable term to be used in place of the parameter node when the expression is evaluated. The bindable term can be a hard value, another expression, another parameter node, or any combination thereof. The bindable term is bound to the parameter node and the expression is evaluated using that bindable term.

Moreover, the expression can be reevaluated with a different bindable term bound to the parameter node. In other words, if a user builds an expression that contains a parameter node as a leaf, the expression can be reused with different values (or bindings) for the parameter. The advantages of embodiments of the reusable expression graph system and method is that a developer does not have to rebuild the entire expression every time they wanted to change the value of a leaf node of the expression graph representing that expression. In other words, embodiments of the reusable expression graph system and method alleviate the developer having to run the code to rebuild the expression every time the value of an expression graph leaf node is changed. Reuse not only saves building the expression, but also allows the reuse of some of the evaluation of the expression. For example in the case where expressions are used to generate code, parameter nodes allow the generated code to be saved and reused for different parameter bindings. In addition, expression graphs can be embedded in various languages through libraries. Parameter nodes used by embodiments of the reusable expression graph system and method allow the reuse of these expression graphs and can be used in any programming language in which the expression graph can be used.

The parameter node is a special kind of leaf node. In the example above shown in FIG. 1, the user could use a parameter node in place of the second leaf node 120. The parameter node allows a user to set the value of the parameter node to different values whenever she wants to evaluate the expression. Those different values are used in place of that parameter node each time the expression is evaluated. In some embodiments of the reusable expression graph system and method, the parameter node has a "type," meaning that it can be specified whether the parameter node takes a floating point value or an integer value. In alternate embodiments of the reusable expression graph system and method, the value of the parameter node can have any type.

The parameter node also allows the expression to be reused, without having to build up the expression again just to change a value (such as the second leaf node 120 shown in FIG. 1). Embodiments of the reusable expression graph system and method allow expression graphs to be built up. In effect the expression graphs are functional. The value at the parameter node can be changed easily without rebuilding the expression. Moreover, each time the user adds a node to the expression this creates a new expression, while the old expression included in the new expression does not change. This is not true of standard non-functional programming languages. Moreover, embodiments of the reusable expression graph system and method can be easily embedded in virtually any programming language.

II.B. Generating a Parameter Node

Figure 2:
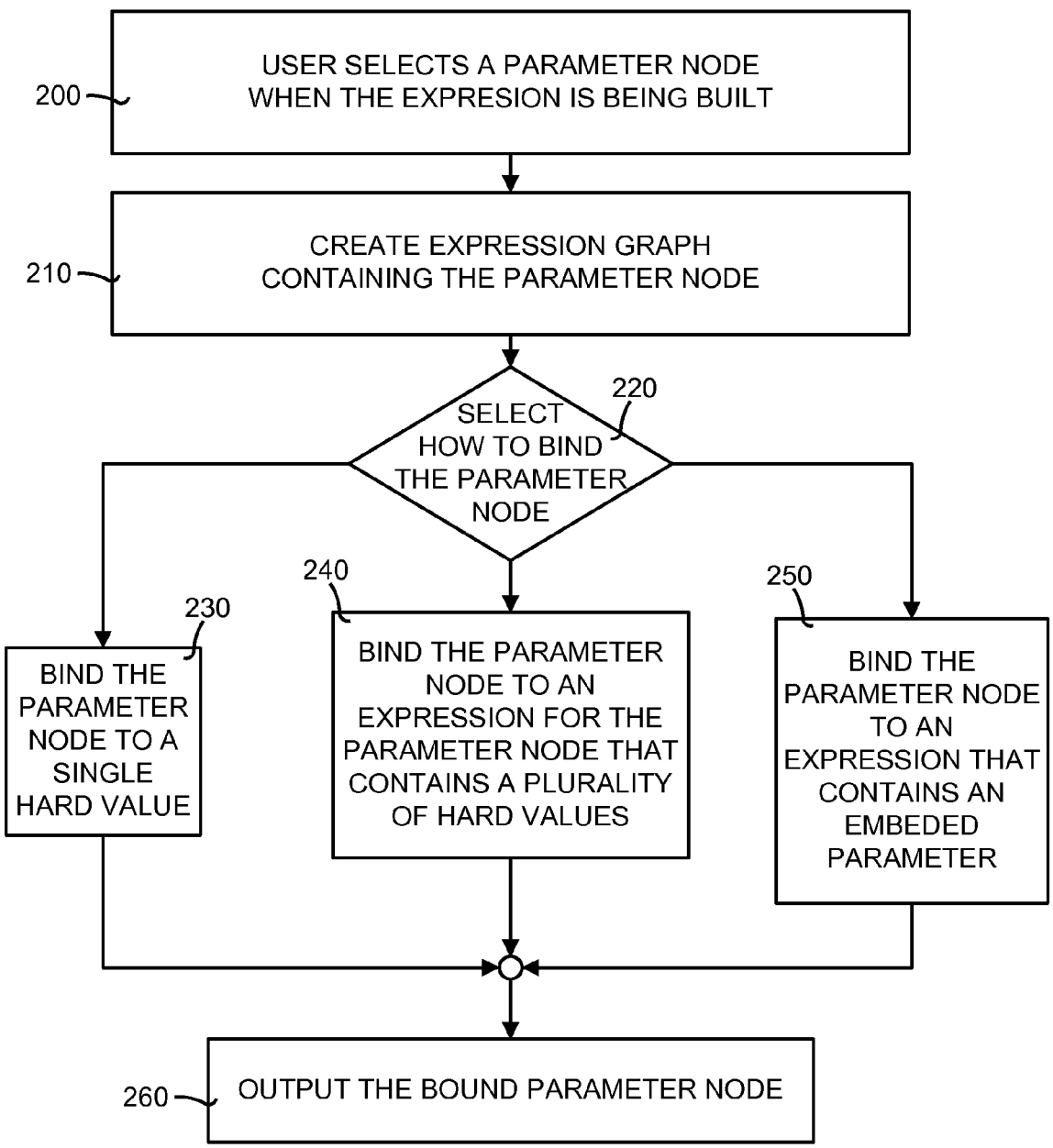
FIG. 2 is a detailed flow diagram illustrating the operational details of the generation of a parameter node for embodiments of the reusable expression graph method.

FIG. 2 is a detailed flow diagram illustrating the operational details of the generation of a parameter node for embodiments of the reusable expression graph method. In general, a parameter node is generated or created by a user when building an expression to make the expression graph reusable. More specifically, as shown in FIG. 2, embodiments of the reusable expression graph method allow a user to select a parameter node when an expression is being built (box 200). Typically, this selection is done by a user, although in some embodiments it may be performed automatically.

Figure 3:
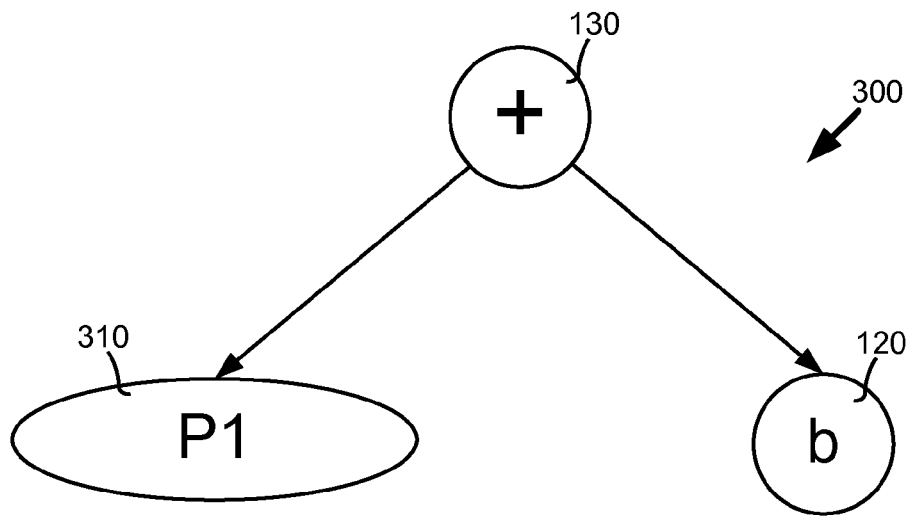
FIG. 3 illustrates an example of a reusable expression graph having a first parameter node "A".

Next, embodiments of the reusable expression graph method create an expression graph containing the parameter node (box 210). As noted above, this parameter node acts as a generic placeholder on the expression graph. FIG. 3 illustrates an example of a reusable expression graph 300 having a first parameter node, P1 310. By comparing FIG. 3 with FIG. 1, it can be seen that first parameter node, P1 310 is used instead of the first node 110. In addition, the operator node 130 still joins the first parameter node P1 310 and the second node 120. This reusable expression graph 300 represents the expression c=P1+b, where P1 is represented by the first parameter node, P1 310 and b is represented by the second node 120.

Figure 4:
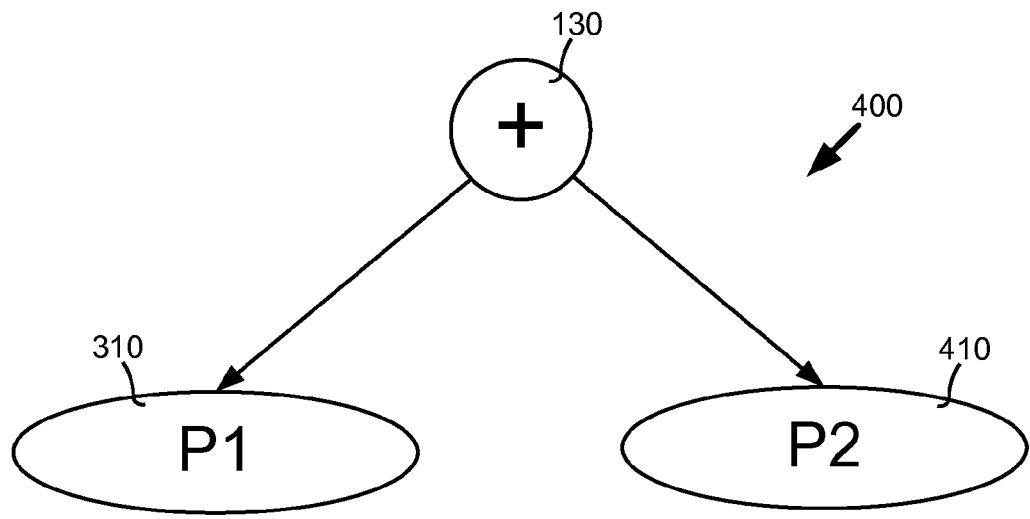
FIG. 4 illustrates an example of a reusable expression graph having the first parameter node "A" and a second parameter node "B".

Embodiments of the reusable expression graph system and method also allow the use of as many parameter nodes as there are leaf nodes in an expression graph. FIG. 4 illustrates an example of a reusable expression graph 400 having the first parameter node, P1 310 and a second parameter node, P2 410. The first parameter node, P1 310 and the second parameter node P2 410 are joined by the operator node 130. The reusable expression graph 400 in this case represents the expression given by c=P1+P2, where again P1 is represented by the first parameter node P1 310 and P2 is represented by the second parameter node, P2 410.

Referring back to FIG. 2, a decision then is made (typically by the user) on how to bind the parameter node (box 220). In general, the parameter node can be bound to virtually anything. In some embodiments the user selects what values or expressions to bind to the parameter node. The parameter node does not have to be bound to a leaf value. The parameter can be bound to a leaf, which would be a hard value, or a two-dimensional array, or it can be bound to another expression in the form of another directed acyclic graph. One way in which the parameter node can be bound is to a single hard value (boxes 230). By "hard value" it is meant a value that is a constant. The value may a single value or a multi-dimensional array of values. For example, a single hard value may be the number "8", while one-dimensional arrays of numbers and two-dimensional arrays of numbers may also be used and included in the phrase "hard value."

Figure 5:
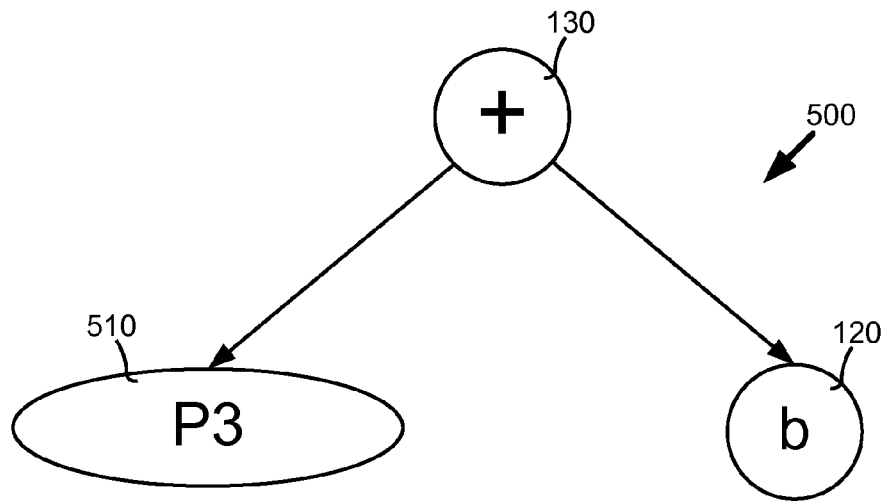
FIG. 5 illustrates an example of a reusable expression graph having a second parameter node "A", the second leaf node, and joined by the operator node.

Another way in which the parameter node can be bound is to bind the parameter node to an expression that contains a plurality of hard values (box 240). FIG. 5 illustrates an example of a reusable expression graph 500 having a third parameter node, P3 510, the second node 120, and joined by the operator node 130. The reusable expression graph 500 in this case represents the expression given by c=P3+b, where P3 is represented by the third parameter node, P3 510 and b is represented by the second node 120. In this example shown in FIG. 5, P3=(a*b). This means that the third parameter node, P3510 is bound to an expression that contains a plurality of hard values, or (a*b).

Figure 6:
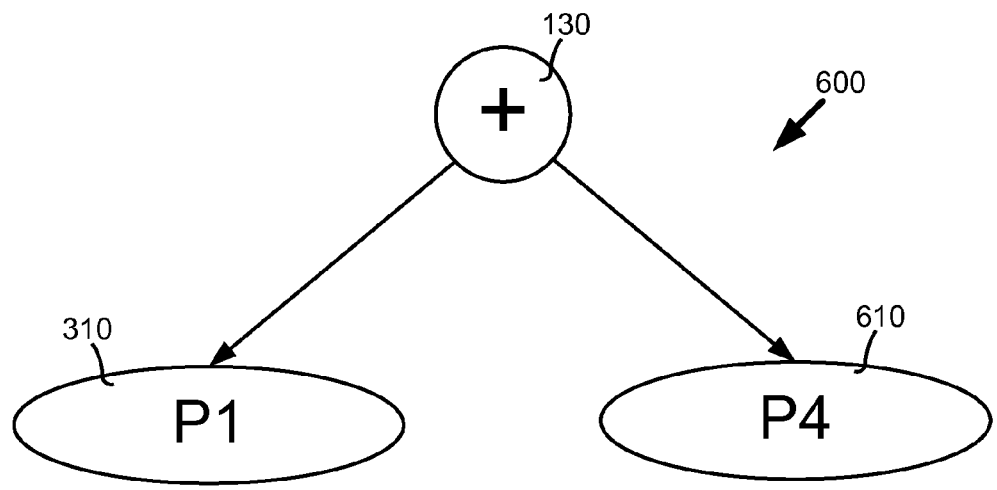
FIG. 6 illustrates an example of a reusable expression graph having the first parameter node "A", a third parameter node "B", and joined by the operator node.

Still another way in which the parameter node can be bound is to bind the parameter node to an expression that contains an embedded parameter (box 250). FIG. 6 illustrates an example of a reusable expression graph 600 having the first parameter node, P1 310, a fourth parameter node, P4 610, and joined by the operator node 130. The reusable expression graph 600 in this case represents the expression given by c=P1+P4, where P1 is represented by the first parameter node, P1 310 and P4 is represented by the fourth parameter node, P4 610. In this example shown in FIG. 6, the parameter node contains another parameter node. In particular, P4=(a*P5). This means that the fourth parameter node, P4 610 is bound to an expression that contains an embedded parameter node, or (a*P5). Once the parameter node is bound in the selected manner, embodiments of the reusable expression graph method output the bound parameter node (box 260).

II.C. Using the Parameter Node

Figure 7:
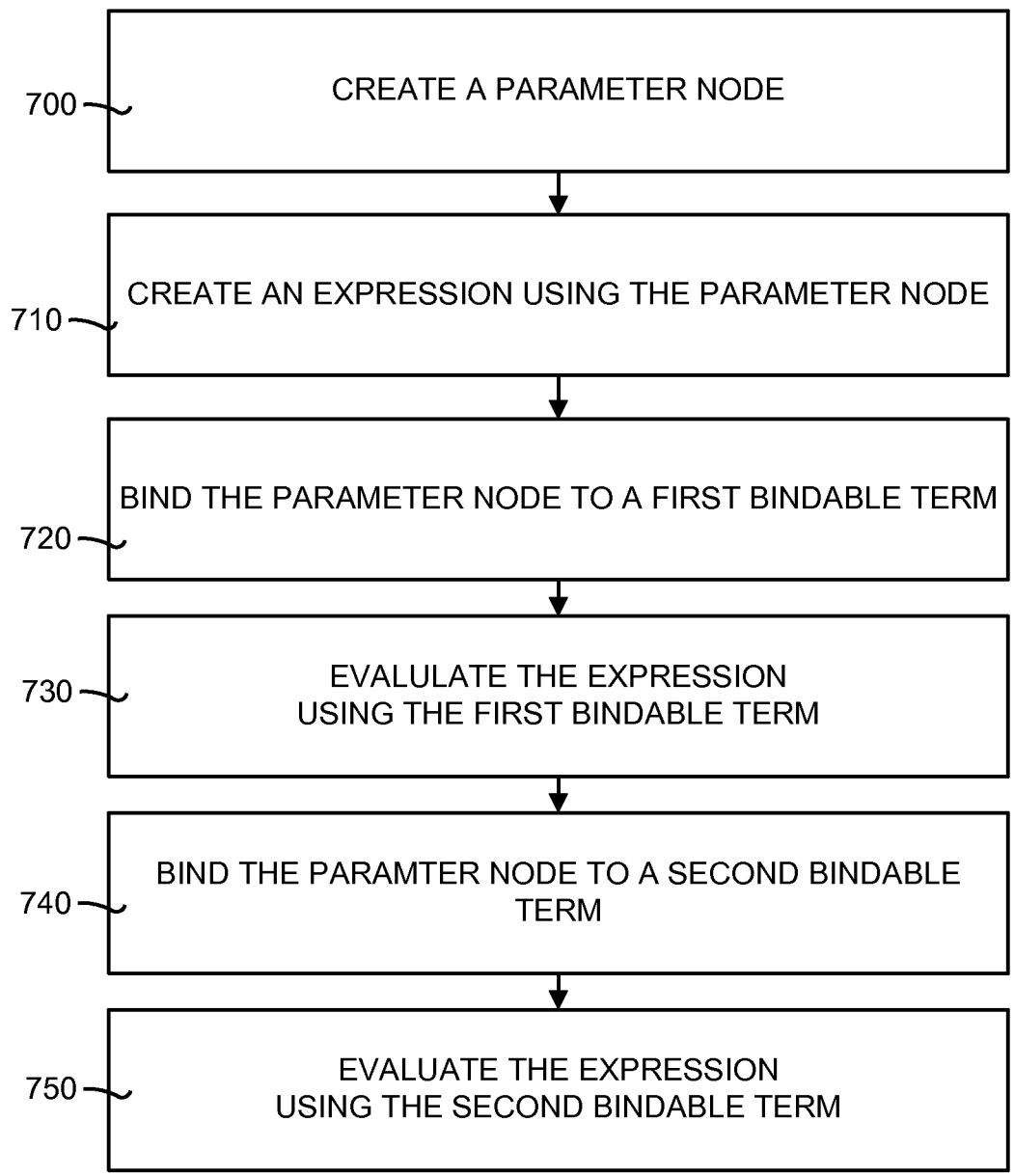
FIG. 7 is a flow diagram illustrating the operation of embodiments of the reusable expression graph system and method shown in FIGS. 2-6.

Embodiments of the reusable expression graph system and method not only create or generate the parameter node as a replacement for a leaf node, but also use the parameter node to obtain a reusable expression graph. FIG. 7 is a flow diagram illustrating the operation of embodiments of the reusable expression graph system and method shown in FIGS. 2-6. In general, embodiments of the reusable expression graph system and method create a parameter node for an expression graph and use the parameter node in evaluating the expression represented by the expression graph. In particular, referring to FIG. 7, the method begins by creating or generating a parameter node (box 700). This process of generating the parameter node is described in above in the discussion about FIG. 2. Next, a user generates an expression using the parameter node (box 710). This expression can be represented by an expression graph, and the expression graph contains the parameter node.

Embodiments of the reusable expression graph system and method then bind the parameter node to a first bindable term (box 720). The expression then is evaluated using the first bindable term in place of the parameter node (box 730). In this way the expression graph is reusable because the expression behaves like a function. The values currently bound are the parameters with which the expression is evaluated.

The expression graph then is reused by binding the parameter node to a second bindable term (box 740). The expression then is evaluated using the second bindable term (box 750). In this manner, the reusable expression graph can be reused by binding different values to the parameter node. The expression then can be evaluated without the need to rebuild the expression each time the value is changed.

III. Exemplary Operating Environment

Embodiments of the reusable expression graph system and method are designed to operate in a computing environment. The following discussion is intended to provide a brief, general description of a suitable computing environment in which embodiments of the reusable expression graph system and method may be implemented.

Figure 8:
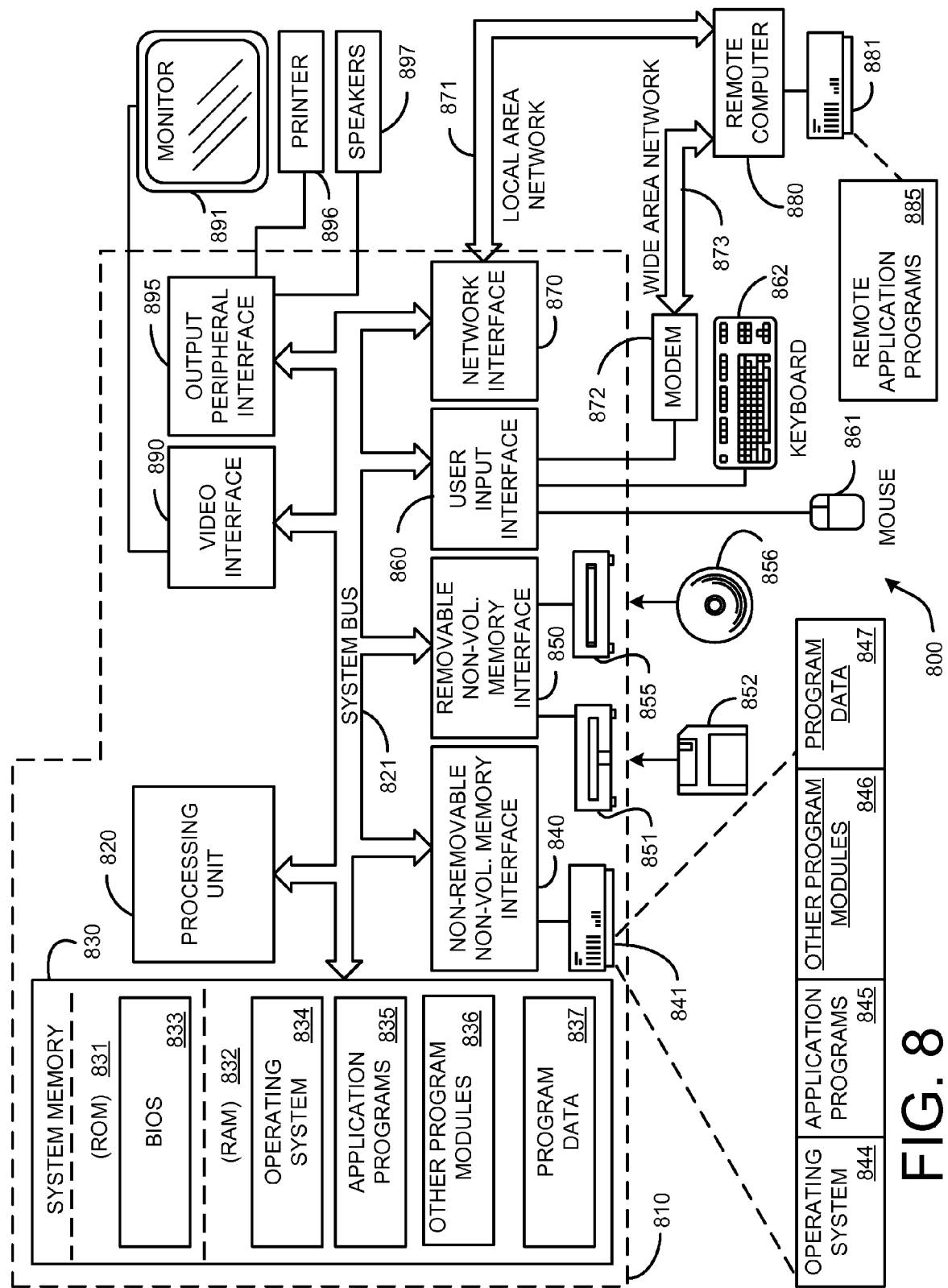
FIG. 8 illustrates an example of a suitable computing system environment in which embodiments of the reusable expression graph system and method shown in FIGS. 2-7 may be implemented.

FIG. 8 illustrates an example of a suitable computing system environment in which embodiments of the reusable expression graph system and method shown in FIGS. 2-7 may be implemented. The computing system environment 800 is only one example of a suitable computing environment and is not intended to suggest any limitation as to the scope of use or functionality of the invention. Neither should the computing environment 800 be interpreted as having any dependency or requirement relating to any one or combination of components illustrated in the exemplary operating environment.

Embodiments of the reusable expression graph system and method are operational with numerous other general purpose or special purpose computing system environments or configurations. Examples of well known computing systems, environments, and/or configurations that may be suitable for use with embodiments of the reusable expression graph system and method include, but are not limited to, personal computers, server computers, hand-held (including smartphones), laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

Embodiments of the reusable expression graph system and method may be described in the general context of computer-executable instructions, such as program modules, being executed by a computer. Generally, program modules include routines, programs, objects, components, data structures, etc., that perform particular tasks or implement particular abstract data types. Embodiments of the reusable expression graph system and method may also be practiced in distributed computing environments where tasks are performed by remote processing devices that are linked through a communications network. In a distributed computing environment, program modules may be located in both local and remote computer storage media including memory storage devices. Still further, the aforementioned instructions may be implemented, in part or in whole, as hardware logic circuits, which may or may not include a processor. With reference to FIG. 8, an exemplary system for embodiments of the reusable expression graph system and method includes a general-purpose computing device in the form of a computer 810.

Components of the computer 810 may include, but are not limited to, a processing unit 820 (such as a central processing unit, CPU), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 810 typically includes a variety of computer readable media. Computer readable media can be any available media that can be accessed by the computer 810 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 810. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within the computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable, volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies. A user may enter commands and information (or data) into the computer 810 through input devices such as a keyboard 862, pointing device 861, commonly referred to as a mouse, trackball or touch pad, and a touch panel or touch screen (not shown).

Other input devices (not shown) may include a microphone, joystick, game pad, satellite dish, scanner, radio receiver, or a television or broadcast video receiver, or the like. These and other input devices are often connected to the processing unit 820 through a user input interface 860 that is coupled to the system bus 821, but may be connected by other interface and bus structures, such as, for example, a parallel port, game port or a universal serial bus (USB). A monitor 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 8. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on memory device 881. It will be appreciated that the network connections shown are exemplary and other means of establishing a communications link between the computers may be used.

The foregoing Detailed Description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A computing system comprising:
   a processing unit; and
   one or more computer storage media having computer readable instructions stored thereon that, when executed by the processing unit, cause the processing unit to:
   build a reusable expression graph using a parameter node as a leaf node that acts as a placeholder, wherein the reusable expression graph represents an expression;
   bind the parameter node to a bindable term such that the parameter node acts act as a proxy for the bindable term, the bindable term comprising another expression that contains a plurality of hard values; and
   evaluate the expression using the bindable term comprising the another expression that contains the plurality of hard values.

2. The computing system of claim 1, wherein the computer readable instructions further cause the processing unit to:
   receive a user input selecting the another expression, and
   bind the parameter node to the bindable term comprising the another expression responsive to the user input.

3. The computing system of claim 1, wherein the computer readable instructions further cause the processing unit to:
   reuse the reusable expression graph by:
      binding the parameter node to another bindable term comprising a single hard value, and
      reevaluating the expression with the parameter node bound to the another bindable term comprising the single hard value without rebuilding the expression.

4. The computing system of claim 1, wherein the computer readable instructions further cause the processing unit to:
   reuse the reusable expression graph by:
      binding the parameter node to another bindable term comprising a further expression, and
      reevaluating the expression using the further expression instead of the another expression without rebuilding the expression.

5. The computing system of claim 4, wherein the further expression comprises multiple hard values that are different than the plurality of hard values of the another expression.

6. The computing system of claim 1, wherein the another expression comprises a directed acyclic graph.

7. One or more computer-readable memory devices or storage devices storing computer readable instructions which, when executed by a processing unit of a computing device, cause the processing unit to perform acts comprising:
   building a reusable expression graph using a parameter node as a leaf node that acts as a placeholder, wherein the reusable expression graph represents a first expression;
   binding the parameter node to a bindable term comprising a second expression that contains an embedded parameter; and
   evaluating the first expression using the bindable term comprising the second expression that contains the embedded parameter.

8. The one or more computer-readable memory devices or storage devices of claim 7, wherein the reusable expression graph comprises another parameter node corresponding to the embedded parameter.

9. The one or more computer-readable memory devices or storage devices of claim 7, the acts further comprising:
   reusing the reusable expression graph by:
      binding the parameter node to another bindable term comprising a third expression, and
      evaluating the first expression using the third expression instead of the second expression without rebuilding an entirety of the first expression.

10. The one or more computer-readable memory devices or storage devices of claim 9, wherein the third expression contains another embedded parameter.

11. The one or more computer-readable memory devices or storage devices of claim 9, wherein the third expression contains a hard value and does not contain another embedded parameter.

12. The one or more computer-readable memory devices or storage devices of claim 9, wherein the third expression contains a plurality of hard values.

13. The one or more computer-readable memory devices or storage devices of claim 7, wherein the parameter node has an associated data type indicating the parameter node takes an integer value.

14. The one or more computer-readable memory devices or storage devices of claim 7, wherein the parameter node has an associated data type indicating the parameter node takes a floating point value.

15. A computer-readable memory device or storage device storing a reusable expression graph, the reusable expression graph comprising:
   an operator node containing an operator;
   a first parameter node that acts as a first placeholder; and
   a second parameter node that is joined to the first parameter node by the operator node,
   wherein the first parameter node comprises at least one operator and at least one operand.

16. The computer-readable memory device or storage device of claim 15, further storing computer readable instructions which, when executed by a processing unit of a computing device, cause the processing unit to perform acts comprising:
   evaluating an expression represented by the reusable expression graph, including evaluating the at least one operator and the at least one operand.

17. The computer-readable memory device or storage device of claim 16, the reusable expression graph further comprising a third parameter node.

18. The computer-readable memory device or storage device of claim 17, wherein the third parameter node further comprises a fourth parameter node.

19. The computer-readable memory device or storage device of claim 18, wherein the third parameter node further comprises another operator and the fourth parameter node is another operand.

20. The computer-readable memory device or storage device of claim 15, further storing computer readable instructions which, when executed by a processing unit of a computing device, cause the processing unit to perform acts comprising:
   at a first time, evaluating an expression represented by the reusable expression graph by evaluating the at least one operator and the at least one operand;
   binding the first parameter node to a different operator and a different operand; and
   at a second time, evaluating the expression represented by the reusable expression graph by evaluating the different operator and the different operand instead of the at least one operator and the at least one operand without rebuilding an entirety of the expression.

* * * * *